(12) United States Patent
Schumann, III et al.

(10) Patent No.: US 12,494,900 B2
(45) Date of Patent: Dec. 9, 2025

(54) PUBLIC KEY INFRASTRUCTURE BASED SESSION AUTHENTICATION

(71) Applicant: Juniper Networks, Inc., Sunnyvale, CA (US)

(72) Inventors: Robert Walter Schumann, III, Ashburn, VA (US); Jeremy Guiles, Crownsville, MD (US); Boris Kilimnik, Ellicott City, MD (US); Donald Brian Troshynski, Clifton, VA (US); Adam Morris, Des Moines, WA (US)

(73) Assignee: Juniper Networks, Inc., Sunnyvale, CA (US)

( * ) Notice: Subject to any disclaimer, the term of this patent is extended or adjusted under 35 U.S.C. 154(b) by 101 days.

(21) Appl. No.: 17/649,629

(22) Filed: Feb. 1, 2022

(65) Prior Publication Data
US 2023/0246819 A1    Aug. 3, 2023

(51) Int. Cl.
H04L 9/08    (2006.01)
H04L 9/32    (2006.01)

(52) U.S. Cl.
CPC .......... H04L 9/0825 (2013.01); H04L 9/0861 (2013.01); H04L 9/3247 (2013.01); H04L 9/3263 (2013.01)

(58) Field of Classification Search
CPC ... H04L 9/0825; H04L 9/0861; H04L 9/3247; H04L 9/3263
See application file for complete search history.

(56) References Cited

U.S. PATENT DOCUMENTS

| 9,729,439 | B2 | 8/2017 | MeLampy et al. |
| 10,511,590 | B1 | 12/2019 | Bosch et al. |
| 10,607,027 | B1* | 3/2020 | Ben Naim ............. G06F 21/64 |
| 10,659,434 | B1 | 5/2020 | Kim et al. |
| 2002/0108042 | A1* | 8/2002 | Oka ..................... H04L 9/3247 |
| | | | 713/175 |

(Continued)

OTHER PUBLICATIONS

Extended Search Report from counterpart European Application No. 22215323.1 dated Jul. 5, 2023, 11 pp.

(Continued)

*Primary Examiner* — Philip J Chea
*Assistant Examiner* — Ghizlane Maazouz
(74) *Attorney, Agent, or Firm* — Shumaker & Sieffert, P.A.

(57) ABSTRACT

Techniques are disclosed for public key infrastructure (PKI) based session authentication. An example network device includes one or more processors and memory coupled to the one or more processors. The memory stores instructions that, upon execution, cause one or more processors to: receive, from a source client device, a packet including a header for routing the packet to a destination client device specified within the header and metadata distinct from the header, the metadata specifying public key infrastructure (PKI) information and identity context information identifying a user or device participating in a session between the source client device and the destination client device; verify, based on the PKI information within the metadata, the metadata; and in response to verifying the metadata, apply, based on the identity context information, one or more policy rules for the session associated with the packet.

20 Claims, 5 Drawing Sheets

(56) References Cited

U.S. PATENT DOCUMENTS

| | | | |
|---|---|---|---|
| 2008/0285560 A1 | 11/2008 | Curtis et al. | |
| 2009/0265327 A1 | 10/2009 | Zou | |
| 2012/0215898 A1* | 8/2012 | Shah | H04L 65/1069 709/223 |
| 2014/0237539 A1 | 8/2014 | Wing et al. | |
| 2015/0188810 A1* | 7/2015 | Salkintzis | H04W 40/00 370/328 |
| 2016/0224799 A1* | 8/2016 | Uzun | G06F 21/6227 |
| 2017/0054688 A1* | 2/2017 | Bhattacharjee | H04L 63/0254 |
| 2017/0063681 A1* | 3/2017 | Kaplan | H04L 49/252 |
| 2017/0289138 A1* | 10/2017 | Ben-Shalom | H04L 63/0823 |
| 2017/0310579 A1 | 10/2017 | Hayes | |
| 2018/0337920 A1* | 11/2018 | Stites | G06F 21/73 |
| 2019/0089678 A1* | 3/2019 | Lam | H04L 63/0263 |
| 2019/0108097 A1* | 4/2019 | Zhuang | H04L 67/06 |
| 2019/0158625 A1 | 5/2019 | Papageorgiou et al. | |
| 2020/0252315 A1* | 8/2020 | Cociglio | H04L 43/026 |
| 2021/0243038 A1* | 8/2021 | Wilson | G01S 19/14 |
| 2021/0344512 A1* | 11/2021 | Xu | H04L 63/168 |
| 2022/0006652 A1* | 1/2022 | Mishra | H04L 9/3268 |
| 2022/0131709 A1* | 4/2022 | Nix | H04L 9/3252 |
| 2022/0141192 A1* | 5/2022 | Silveira | H04L 63/0823 726/15 |
| 2022/0247554 A1* | 8/2022 | Peddada | H04L 9/0897 |
| 2023/0014894 A1* | 1/2023 | M M | H04L 9/0852 |
| 2023/0224332 A1* | 7/2023 | Zhong | H04L 63/0428 726/4 |
| 2023/0308424 A1* | 9/2023 | Nix | H04L 9/3242 |
| 2023/0361994 A1* | 11/2023 | Nix | H04L 9/0819 |

OTHER PUBLICATIONS

Kim et al., "Lightweight source authentication and path validation", Computer Communications Network, Aug. 17, 2014, pp. 271-282.
Menon et al., "Secure Vector Routing (SVR)", Network Working Group, Sep. 20, 2022, pp. 1-99.
Dierks et al., "The Transport Layer Security (TLS) Protocol Version 1.2", RFC5246, Aug. 2008, 104 pp.
Postel et al., "Transmission Control Protocol", RFC793, Sep. 1981, 91 pp.
Postel et al., "User Datagram Protocol", RFC768, Aug. 28, 1980, 3 pp.
Rescorla et al., "The Transport Layer Security (TLS) Protocol Version 1.3", RFC8446, Aug. 2018, 160 pp.
U.S. Appl. No. 16/410,100, filed May 13, 2019, naming inventors Kaplan et al.
U.S. Appl. No. 16/410,122, filed May 13, 2019, naming inventors Kaplan et al.
U.S. Appl. No. 17/011,174, filed Sep. 3, 2020, naming inventors MeLampy et al.
U.S. Appl. No. 17/011,181, filed Sep. 3, 2020, naming inventors MeLampy et al.
YouTube "Identity Context Driver from 128 Technology (2)" 128 Technology, uploaded Aug. 17, 2020, accessed from YouTube at https://www.youtube.com/watch?v=dWNGi_k8ZJk.
Menon et al., "Secure Vector Routing," IETF Network Working Group, Oct. 1, 2021, 38 pp.
U.S. Appl. No. 17/652,128, filed Feb. 23, 2022, naming inventors MeLampy et al.
U.S. Appl. No. 17/652,129, filed Feb. 23, 2022, naming inventors MeLampy et al.
Response to Extended Search Report dated Jul. 5, 2023, from counterpart European Application No. 22215323.1 filed Feb. 2, 2024, 28 pp.
"Information technology—Open Systems Interconnection—The Directory: Public-key and attribute certificate frameworks," Recommendation ITU-T X.509, edition 9.0, International Telecommunications Union (ITU), Oct. 2019, 236 pp.
Jones et al., "JSON Web Algorithms (JWA)", Internet Engineering Task Force (IETF), May 2015, 69 pp., RFC 7518.
Josefsson et al., "Textual Encodings of PKIX, PKS, and CMS Structures", Internet Engineering Task Force (IETF), Apr. 2015, 20 pp., RFC 7468.
Juniper Networks, "Adding a Trusted Certificate", Juniper Networks, Inc., 3 pp., Retrieved from the Internet on Dec. 31, 2024 from URL: https://www.juniper.net/documentation/us/en/software/session-smart-router/docs/howto_trusted_ca_certificate/.
Katz et al., Bidirectional Forwarding Detection (BFD) for IPV4 and IPV6 (Single Hop), Internet Engineering Task Force (IETF), RFC 5881, Jun. 2010, 7 pp.
Katz et al., "Bidirectional Forwarding Detection (BFD)," Internet Engineering Task Force (IETF), RFC 5880, Jun. 2010, 49 pp.
Menon et al., "Juniper's Secure Vector Routing (SVR)", draft-menon-svr-06, Jun. 17, 2024, 81 pp.
Menon et al., "Juniper's Secure Vector Routing (SVR)", draft-menon-svr-07, Nov. 4, 2024, 83 pp., Retrieved from the Internet on Dec. 31, 2024 from URL: https://datatracker.ietf.org/doc/draft-menon-svr/.
Menon et al., "Secure Vector Routing (SVR)", draft-menon-svr-05, Mar. 18, 2024, 85 pp.
Nir et al., "Elliptic Curve Cryptography (ECC) Cipher Suites for Transport Layer Security (TLS) Versions 1.2 and Earlier", Internet Engineering Task Force (IETF), Aug. 2018, 34 pp., RFC 8422.
Communication pursuant to Article 94(3) EPC from counterpart European Application No. 22215323.1 dated Jun. 11, 2025, 7 pp.
Response to Communication pursuant to Article 94(3) EPC dated Jun. 11, 2025, from counterpart European Application No. 22215323.1 filed Oct. 10, 2025, 10 pp.

* cited by examiner

PUBLIC KEY INFRASTRUCTURE BASED SESSION AUTHENTICATION

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, Layer 3 (L3) network devices that operate within Layer 3 of the OSI reference model, i.e., the network layer, and Layer 4 (L4) network devices that operate within Layer 4 of the OSI reference model, i.e., the transport layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow.

Alternatively, a session may be unidirectional in that the session includes packets traveling in only one direction from a first device to a second device. For example, a session includes a forward packet flow originating from a first device and destinated for a second device. A different session may include a reverse packet flow originating from the second device and destined for the first device.

To establish a session, computing devices may use one or more communication session protocols including Transmission Control Protocol (TCP), Transport Layer Security (TLS), User Datagram Protocol (UDP), Internet Control Message Protocol (ICMP), Encapsulating Security Payload (ESP), etc.

SUMMARY

In general, techniques are described for providing public key infrastructure (PKI) based session authentication. For example, a source device (e.g., client device) may establish a session with a destination device (e.g., server hosting an application or service). To ensure a secure transfer of data between the source and destination devices, the devices may use a PKI to encrypt and sign data. For example, an end-user or device is issued a digital certificate (referred to herein as simply "certificate") for identification and authorization. Certificates are used to distribute public keys and provide assurance that the public keys are owned by authenticated users or devices associated with the certificates. The source device may use a private key to "sign" (e.g., encrypt) the data (referred to as a "digital signature" or simply "signature") and sends the data with the public key to the destination device. The destination device may use the public key and signature to cryptographically verify the data is actually generated by the source device.

In accordance with the techniques described in this disclosure, a source client device sends a packet including information about the user and/or machine-specific information (referred to herein as "identity context information") and PKI information as metadata of the packet to a router configured to perform session-based routing. The identity context information may include the source application, user, security identifier, domain, or other information identifying of the user and/or device for the session. The PKI information may include a public key. In some examples, the source client device may sign the metadata with a private key (otherwise referred to as a "signature"). In response to receiving the packet including metadata specifying the identity context information and PKI information, the router examines the metadata of the packet and cryptographically verifies the metadata based on the PKI information within the metadata. If verified, the router applies, based on the identity context information specified by the metadata, one or more policy rules (e.g., allow or deny access to a service) for the session associated with the packet.

In some examples, a source client device may receive a symmetric encryption key generated by the router and may use the symmetric encryption key to further encrypt the metadata (or payload including the metadata) of the packet. For example, the source client device may initialize a transport layer security (TLS) session with the router, and in response to validation of certificates, the router generates a symmetric encryption key and sends the symmetric encryption key to the source client device. The source client device uses the symmetric encryption key to encrypt the metadata or payload of the packet including the metadata and sends the packet to the router, which decrypts the metadata or payload including the metadata of the packet using the symmetric encryption key to recover the metadata, verify the metadata, and if verified, apply, based on the identity context information, a policy for the session associated with the packet. In some examples, the router uses the symmetric encryption key to encrypt the payload of a packet (e.g., response packet) that is sent towards the source client device.

The techniques of the disclosure may provide specific improvements to the computer-related field of computer networking that have practical applications. For example, the addition of PKI information within the metadata of the packet may provide an additional level of cryptographic verification of the identity context information included in metadata of the packet. That is, because the router is able to verify that the client device is able to sign the metadata with a private key (which is difficult to forge), the network device is assured that the identity context information included in the metadata belongs to the user or device that sent the information. Moreover, the inclusion of identity context information and PKI information within metadata of the packet provides an in-band solution such that routers within the network need not query a device outside of the network (e.g., via an Application Programming Interface (API)) to make decisions on security access or to obtain data necessary to allow a device to make access decisions, which may not be available in certain networks, such as government networks that do not allow outside access or operate in environments with poor connectivity (e.g., disrupted, disconnected, intermittent and low-bandwidth (DDIL) environments).

In one example, this disclosure describes a network device including one or more processors and memory coupled to the one or more processors, the memory storing instructions that, upon execution, cause one or more processors to: receive, from a source client device, a packet including a header for routing the packet to a destination client device specified by the header and metadata distinct from the header, the metadata specifying public key infrastructure (PKI) information and identity context information identifying a user or device participating in a session between the source client device and the destination client device; and verify, based on the PKI information specified by the metadata, the metadata; and in response to verifying the metadata, apply, based on the identity context information, one or more policy rules for the session associated with the packet.

In another example, this disclosure describes a method including: receiving, by a network device and from a source client device, a packet including a header for routing the packet to a destination client device specified by the header and metadata distinct from the header, the metadata specifying public key infrastructure (PKI) information and identity context information identifying a user or device participating in a session between the source client device and the destination client device; verifying, by the network device and based on the PKI information specified by the metadata, the metadata; and in response to verifying the metadata, applying, by the network device and based on the identity context information, one or more policy rules for the session associated with the packet.

In another example, this disclosure describes a client device including one or more processors and memory coupled to the one or more processors, the memory storing instructions that upon execution cause one or more processors to: obtain identity context information identifying a user or device participating in a session between the source client device and a destination client device; obtain public key infrastructure (PKI) information from a client digital certificate; and send, to a network device, a packet for the session including a header for routing the packet to the destination client device specified within the header and metadata distinct from the header, the metadata specifying the identity context information and the PKI information.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
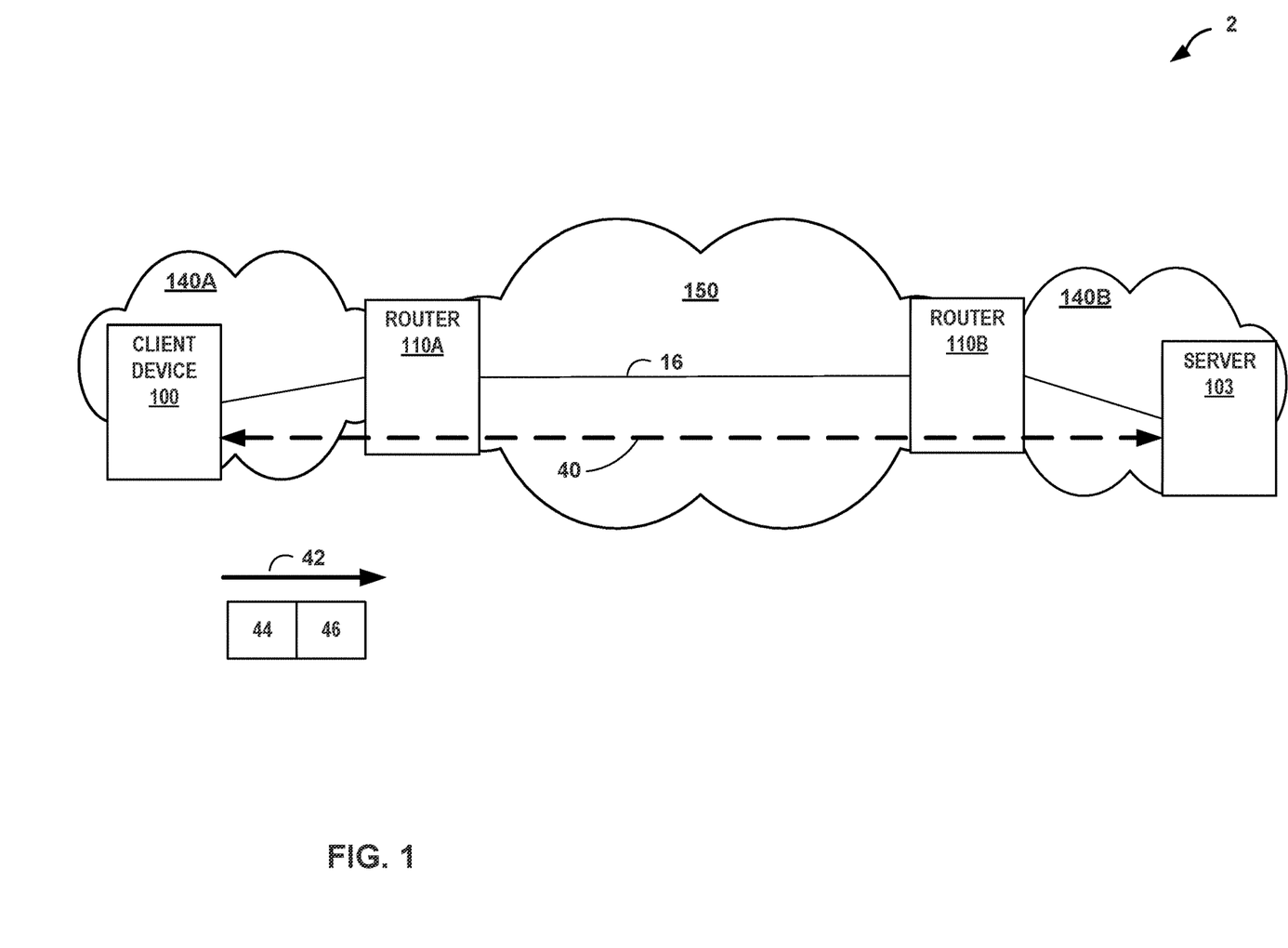
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes a service provider network 150 configured to provide Wide Area Network (WAN) connectivity to disparate customer networks 140A-140B (collectively, "customer networks 140"). Routers 110A-110B (collectively, "routers 110") of service provider network 150 provide client devices, e.g., client device 100 and server 103 associated with customer networks 140, respectively, with access to service provider network 150. In some examples, customer networks 140 are enterprise networks. Customer network 140A is depicted as having a single client device 100 and customer network 140B is depicted as having a single server 103 for ease of illustration, but each of customer networks 140 may include any number of devices.

In some examples, customer networks 140 may be L2 computer networks, where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks 140 include many client devices, each of which may communicate across service provider network 150 with one another as described in more detail below.

Service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services. Service provider network 150 may be coupled to one or more networks administered by other providers (not shown), and may thus form part of a large-scale public network infrastructure, e.g., the Internet. Consequently, customer networks 140 may be viewed as edge networks of the Internet. Service provider network 150 may provide computing devices within customer networks 140, such as client device 100 and server 103, with access to the Internet, and may allow the computing devices within customer networks 140 to communicate with each other.

Service provider network 150 represents a publicly accessible computer network that is owned and operated by a service provider. A service provider is usually a large telecommunications entity or corporation. A service provider network 150 is usually a large L3 computer network that natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although routers 110 are illustrated in the example of FIG. 1, the techniques of the disclosure may be implemented using any network device, such as routers, switches, gateways, or other suitable network devices that may send and receive network traffic. Customer networks 140 may be networks for geographically separated sites of an enterprise, for example. Routers 110 may be connected via one or more communication links, e.g., communication link 16. Communication link 16 may be Ethernet, ATM or any other suitable network connection.

Although additional routers are not shown for ease of explanation, it should be understood that system 2 may comprise additional network and/or computing devices such as, for example, one or more additional routers, switches, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along communication link 16, such that the network elements of system 2 are not directly coupled. Although computer network system 2 is illustrated in the example of FIG. 1 as including a single service provider network 150, in other examples computer network system 2 may alternatively include a plurality of service provider networks that each provide connectivity between customer networks 140.

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100 of system 2 establishes session 40 with server 103. In some examples, client device 100 may be considered a "source" device in that client device 100 originates session 40 between client device 100 and server 103, e.g., client device 100 is the "source" of a packet of a forward flow of the session. Session 40 includes a forward packet flow originating from client device 100 and destined for server 103 and a reverse packet flow originating from server 103 and destined for client device 100. A forward flow for session 40 traverses a path including, e.g., client device 100, routers 110, and server 103.

In some examples, routers 110 may extend session 40 as an L3 session across service provider network 150 according to one or more L3 communication session protocols, including TCP or UDP, etc. For example, to establish session 40 according to TCP such that data may be exchanged according to TCP, client device 100 and server 103 perform a three-way handshake. Client device 100 sends a first packet comprising a "SYN" flag to server 103. Server 103 acknowledges receipt of the first packet by responding to client device 100 with a second packet comprising a "SYN-ACK" flag. Client device 100 acknowledges receipt of the second packet by responding to server 103 with a third packet comprising an "ACK" flag. After sending the third packet, session 40 is established according to TCP and client device 100 and server 103 may exchange data with one another via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that client device 100 does not verify that server 103 is capable of receiving data prior to transmitting data. To establish session 40 according to UDP, client device 100 transmits a first packet to server 103. Session 40 may be considered "established" according to UDP upon receipt by client device 100 of any packet from server 103, which implies that server 103 successfully received the first packet from client device 100, responded, and client device 100 was able to receive the response from server 103. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when router 110A receives a packet for a forward packet flow of session 40, router 110A determines whether the packet belongs to a new session (e.g., is the "first" packet or "lead" packet of session 40). In some examples, router 110A determines whether information of the first packet (e.g., 5-tuple including a source address, source port, destination address, destination port, and protocol) matches an entry in a session table. If no such entry exists, router 110A determines that the packet belongs to a new session and creates an entry in the session table. For example, router 110A may generate a session identifier for session 40 and associate the session identifier with an entry comprising, e.g., session information of the first packet. For example, the entry may include a source address and source port of client device 100A, a destination address and destination port of server 103, tenant information, and/or service information. Router 110A may use the session information to identify subsequent packets as belonging to the same session and forward the subsequent packets along the same path as the first packet.

Router 110A modifies the first packet to include metadata specifying the session identifier and session information. The metadata may be distinct from the header and located between the outer transport layer header and the payload. Router 110A replaces the outer transport layer header of the modified first packet to route the packet to a next hop router, e.g., router 110B. For example, router 110A replaces the header of the modified first packet to specify a source address that is an address of router 110A, a source port that is a port via which router 110A forwards the modified first packet toward client device 100B, a destination address that is an address of the next hop to which router 110A forwards the first packet (e.g., an address of router 110B), and a destination port that is a port of the next hop to which router 110A forwards the first packet (e.g., a port of router 110B). Router 110A then forwards the modified first packet to router 110B.

Router 110B receives the modified first packet and determines whether the modified first packet includes metadata specifying the session identifier. In response to determining that the modified first packet includes metadata specifying the session identifier, router 110B generates an entry in its session table with the information specified in the metadata.

As router 110B is an egress, or "terminus" router for session 40, router 110B recovers the original first packet by removing the metadata from the modified first packet and uses the metadata to modify the header of the first packet to specify the original source address, source port, destination address, and destination port to forward the packet to server 103. Router 110B then forwards the recovered first packet to server 103. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017, and Menon, et al., "Secure Vector Routing (SVR)," Internet-Draft, draft-menon-svr-00, Oct. 1, 2021, the entire contents of each of which is incorporated by reference herein.

In some examples, client device 100 may send a first packet of the forward packet flow of session 40 including information about the user and/or machine-specific information (referred to herein as "identity context information") within metadata of the packet. The identity context information may include a security identifier, username, domain name and domain type, process name and trust level of the process, device identifier (e.g., universally unique identifier (UUID)), system information such as static system information (e.g., operating system version, hardware details, patch level) and/or variable system information (e.g., CPU utilization, memory consumption, number of active running processes, URL access by application (e.g., HTTP archive (HAR) file), etc.), or other information identifying of the user and/or device (e.g., machine-specific information relating to the device) for the session. Routers 110 may apply policies based on the identity context information. For example, routers 110 may apply policies for traffic only for a particular application, particular device, and/or particular user. In this way, routers 110 may use the identity context information in the metadata (i.e., "in-band") to determine the context information of the traffic rather than using, for example, "out-of-band" solutions to determine the context information of the traffic, and to perform access decisions at the network layer. Additional examples of identity context information is described in U.S. application Ser. No. 17/011,181, entitled "DEVICE INFORMATION METHOD AND APPARATUS FOR DIRECTING LINK-LAYER COMMUNICATION," filed Sep. 3, 2020, and U.S. application Ser. No. 17/011,174, entitled "USER INFORAMTION METHOD AND APPARATUS FOR DIRECTING LINK-LAYER COMMUNICATION," filed Sep. 3, 2020, the entire contents of both of which is incorporated by reference herein.

In accordance with the techniques described in this disclosure, network system 2 may provide public key infrastructure (PKI) based session authentication to cryptographically verify the identity context information included in metadata of the packet.

In some examples, network system 2 may implement a public key infrastructure to secure traffic between client device 100 and server 103. As one example of a public key infrastructure, a user may be issued a client digital certificate (e.g., via a smart card) to authenticate the user. The client certificate is typically used to "sign" data, encrypt and decrypt data, and establish secure online network connections. The client certificate may include a public key, private key, and encryption algorithm.

In this example, client device 100 may send a packet of session 40, e.g., packet 42, to router 110A that includes, in addition to the identity context information, PKI information within the metadata of packet 42. In some examples, the PKI information specified by the metadata may include the public key obtained from the client certificate and/or other information associated with the client certificate. In some examples, a computed hash of the identity context information and PKI information specified by the metadata is signed with a private key (referred to herein as "signature") to validate the information within the metadata. Client device 100 may send the metadata specifying the identity context information and PKI information in a first packet (e.g., SYN packet) of session 40. In some examples, server 103 may also send identity context information and PKI information in a response packet (e.g., SYN-ACK packet) of session 40 to enable routers 110 to map application to application servers (i.e., to provide mutual authentication of both client device 100 and server 103).

In response to receiving packet 42, router 110A may extract the metadata and use the PKI information to verify the identity context information. For example, router 110A may use the public key (e.g., from the metadata or obtained using a symmetric encryption key identifier included in the packet as described further below) to verify the signature that was signed by client device 100 with the private key. For example, router 110A computes a hash of the metadata of the received packet and if the computed hash is the same as the hash obtained from the decrypted signature (e.g., decrypted using the public key), router 110A determines that client device 100 (or a user of the client device 100) did in fact sign the metadata and has access to the private key used to sign the metadata. Router 110A may also determine if the certificate has been revoked and/or perform access decisions based on one or more policy rules associated with the identity context information. In this way, router 110A may cryptographically verify the identity context information within the metadata of packet 42 when performing access decisions (i.e., whether to allow or deny session 40) based on one or more policy rules associated with the identity context information. Router 110A may then implement the stateful, session-based routing scheme described above that enables each router 110 to independently perform path selection and traffic engineering. For example, router 110A may modify packet 42 to include a second portion of metadata that includes the session identifier for session 40. In this way, each of routers 110 along a route for session 40 may receive the session identifier and the identity context information and PKI information within metadata of the packet.

In some examples, router 110A may verify identity context information across L3 networks where the client is multiple network segments away from the router. For example, router 110A may be placed in a cloud service provider network and act as a gateway for applications hosted at the cloud service provider network, and may also authenticate users and/or devices via the identity context information across the multiple L3 networks that the client would have to traverse to get to the cloud service provider network.

In some examples, client device 100 may encrypt the metadata (or the entire payload including the metadata) using a symmetric encryption key received from a router (e.g., router 110A). Client device 100 may apply symmetric encryption to encrypt and decrypt, such as Advanced Encryption Standard (AES), Rivest Cipher 4 (RC4), RC5, RC6, Data Encryption Standard (DES), International Data Encryption (IDEA), Blowfish, and the like. As further described below, client device 100 may perform a symmetric encryption key exchange process with router 110A to obtain a symmetric encryption key used to encrypt the metadata (or the entire payload including the metadata) of packet 42. In some examples, client device 100 and router 110A may exchange a symmetric encryption key using transport layer security (TLS) connection of a Secure Sockets Layer (SSL) connection. In these examples, client device 100 may initialize a TLS/SSL connection with router 110A and, in response to validating client device 100, generates a symmetric encryption key that may be used by client device 100 to encrypt the metadata (or payload including the metadata) of a packet sent to router 110A or used by router 110A to encrypt a packet (e.g., response packet) sent towards client device 100.

Router 110A sends the symmetric encryption key, and in some examples, a symmetric encryption key identifier associated with the symmetric encryption key to client device 100. In this way, when client device 100 sends packet 42 including metadata specifying identity context information and PKI information, client device 100 may encrypt the metadata using the symmetric encryption key. Client device 100 may further include in packet 42 the symmetric encryption key identifier such that router 110A may, in response to receiving packet 42, use the symmetric encryption key identifier to determine the symmetric encryption key to decrypt the metadata of packet 42. In some examples in which the public key is not specified in the metadata, router 110A may use the symmetric encryption key identifier to obtain the public key used to verify the identity context information that has been signed with the private key. For example, router 110A may include a table or other type of data store that stores the identity context information and PKI information. As further described below, the symmetric encryption key identifier is mapped to the PKI information including the public key, private key, and/or other information included in a client certificate. In this way, client device 100 may send a packet including a symmetric encryption key identifier and metadata specifying the identity context information and PKI information without the public key, and router 110A may use the symmetric encryption key identifier to perform a lookup of the table storing the PKI information to obtain the public key to verify the signed identity context information specified in the metadata.

In some examples, the symmetric encryption key is used to provide validation of the identity context information. In these examples, the metadata need not specify the signature of the identity context information, which eliminates the need to sign each session, which may be process intensive and time consuming.

In some examples, router 110A sends a specified interval to generate a new symmetric encryption key (referred to herein as "key generation interval") to client device 100 such that client device 100 may perform the symmetric encryption key exchange process with router 110A to exchange a new symmetric encryption key in accordance with the key generation interval.

In some examples, client device 100 may implement a Virtual Private Network (VPN) to establish a virtual point-to-point connection with router 110A (e.g., a VPN server) through the use of VPN protocols, such as Point-to-Point Tunneling Protocol (PPTP), Layer 2 Tunnel Protocol (L2TP/IPsec), Wireguard, OpenVPN, Secure Socket Tunneling Protocol (SSTP), Internet Key Exchange version 2 (IKEv2), etc. Based on the VPN protocol, traffic for the VPN may be encrypted. In these examples, client device 100 and router 110A may establish a connection (e.g., TLS connection) to exchange public keys for the VPN such that client device 100 and router 110A may establish a secure connection for the VPN using the shared public keys. In this way, client device 100 may encrypt the metadata of the packet with the PKI-based session authentication techniques, and further encrypt the packet with the encryption for the VPN, which adds and extra layer of encryption using different encryption algorithms and keys.

In some examples, router 110A may also send the signed identity context information to other routers (e.g., router 110B) such that each of routers 110 may create a record of the session that has been cryptographically verified and signed. Each of the records may be sent by routers 110 to a centralized repository, which may maintain a smart ledger for the records. The centralized repository may be maintained by a computing device (not shown) in network system 2. In this way, the centralized repository may maintain a single database of truth to ensure the signed records in the ledger are legitimate and have been cryptographically verified. Additional information with respect to the centralized repository is described in U.S. patent application Ser. No. 16/410,122, entitled "CENTRAL AUTHORITY FOR SERVICE AND TOPOLOGY EXCHANGE," filed May 13, 2019; and U.S. patent application Ser. No. 16/410,100, entitled "SERVICE AND TOPOLOGY EXCHANGE PROTOCOL," filed May 13, 2019, the entire content of each of which is incorporated by reference herein.

Figure 2:
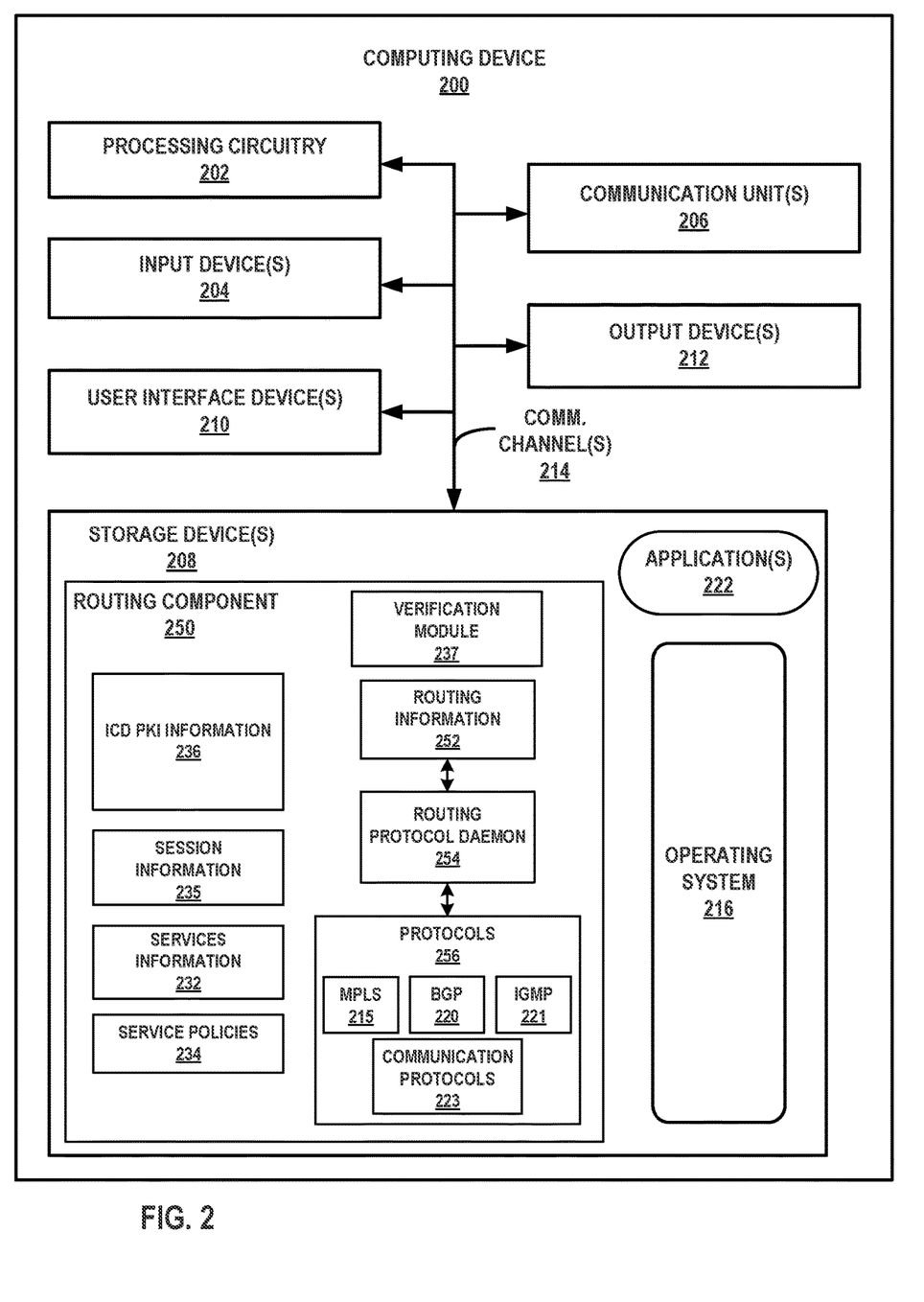
FIG. 2 is a block diagram illustrating an example computing device operating as a router in accordance with the techniques of the disclosure.

FIG. 2 is a block diagram illustrating an example computing device 200 operating as a router in accordance with the techniques of the disclosure. In general, computing device 200 may be an example implementation of one of routers 110 of FIG. 1. FIG. 2 illustrates a particular example of a server or other computing device 200 that includes processing circuitry 202 for executing any one or more of applications 222, routing component 250, or any other computing device described herein. Other examples of computing device 200 may be used in other instances.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., VirtIO and SRIOV network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input devices 204, one or more communication units 206, one or more output devices 212, one or more storage devices 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, is configured to implement functionality and/or process instructions for execution within computing device 200. In some examples, processing circuitry 202 comprises one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 200 during operation. Storage device 208, in some examples, is described as a computer-readable storage medium. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories. In some examples, storage device 208 is used to store program instructions for execution by processing circuitry 202. Storage device 208, in one example, is used by software or applications running on computing device 200 to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication units 206. Computing device 200, in one example, utilizes communication units 206 to communicate with external devices via one or more networks, such as one or more wired/wireless/mobile networks. Communication units 206 may include a network interface, such as an Ethernet card, an optical transceiver, a radio frequency transceiver, or any other type of device that can send and receive information. Other examples of such network interfaces may include 3G and WiFi radios. In some examples, communication units 206 my include a plurality of high-speed network interface cards. In some examples, computing device 200 uses communication unit 206 to communicate with an external device. For example, computing device 200 uses communication unit 206 to communicate with other routers 110 and/or client devices 100 of FIG. 1 via links 16 of FIG. 1 with which communication unit 206 is connected.

Computing device 200, in one example, also includes one or more user interface devices 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for computing device 200.

One or more output devices 212 may also be included in computing device 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processing circuitry 202, communication unit 206, storage device 208, input device 204, user interface devices 210, and output device 212. Applications 222 may also include program instructions and/or data that are executable by computing device 200.

In some examples, processing circuitry 202 executes routing component 250, which determines routes of received packets and forwards the packets accordingly. Routing component 250 communicates with other routers, e.g., such as routers 110 of FIG. 1, to establish and maintain a computer network, such as computer network system 2 of FIG. 1, for transporting network traffic between one or more customer devices. Routing protocol daemon (RPD) 254 of routing component 250 executes software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols, such as TCP, UDP, TLS, or ICMP.

Routing information 252 may describe a topology of the computer network in which computing device 200 resides, and may also include routes through the shared trees in the computer network. Routing information 252 describes various routes within the computer network, and the appropriate next hops for each route, i.e., the neighboring routing devices along each of the routes. Routing information 252 may be a radix tree programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier and an entry including information of the session and stores the session identifier and information in session information 235. Routing component 250 may thereafter use the information stored in session information 235 for the session to identify subsequent packets as belonging to the same session.

In some examples in which performance information (e.g., measured latency, bandwidth, etc.) are added to metadata, session information 235 may store the performance information (e.g., measured latency, bandwidth, etc.) for reporting and/or analytic purposes.

Services information 232 stores information that routing component 250 may use to identify a service associated with a session. In some examples, services information 232 is in the form of a services table. Services information 232 may be included in session information 235 or a separate table. Services information 232 comprises one or more entries that specify a service identifier and an address and/or port associated with the service. In some examples, routing component 250 may query services information 232 with information of a received packet (e.g., one or more of a source address, source port, destination address, destination port, or protocol of a session) to determine a service associated with the session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Differentiated Services Code Point (DSCP) marking policy, a traffic engineering policy, a priority for network traffic associated with the session, access policy, etc. Routing component 250 applies, to the packet, the one or more service policies 234 that correspond to the service associated with the packet.

In accordance with the techniques of the disclosure, computing device 200 provides public key infrastructure based session authentication. For example, routing component 250 is configured to receive a packet including metadata specifying identity context information and PKI information, and cryptographically verify the identity context information. For example, routing component 250 may receive a packet including metadata specifying identity context information and PKI information such as a public key from client device 100, and the metadata signed by client device 100 with a private key. Client device 100 may generate a signature for the metadata, which may be a computed hash value of the identity context information and PKI information that has been encrypted with the private key. In some examples, the metadata in the received packet does not specify the public key. In these examples, the computing device 200 may use the symmetric encryption key identifier included in the received packet to perform a lookup of ICD PKI information 236 that stores the PKI information, as further described below.

In response to receiving the packet including the metadata specifying identity context information and PKI information, verification module 237 of routing component 250 computes a hash value of the metadata, decrypts the signature to obtain the hash value computed by client device 100, and compares the hash values. If the hash values match, verification module 237 determines that client device 100 (or a user of the client device 100) did in fact sign the metadata and has access to the private key used to sign the metadata, and in response to verification of the metadata, may apply, based on the identity context information, one or more policy rules for the session associated with the packet. In some examples, the symmetric encryption key is used to provide validation of the identity context information. In these examples, the metadata need not specify the signature of the identity context information, which eliminates the need to sign each session, which may be process intensive and time consuming.

In some examples, computing device 200 may perform a key exchange process with client device 100 to exchange a symmetric encryption key to further encrypt the metadata (or payload including the metadata). In some examples, protocols 256 may include Transport Layer Security (TLS) or other cryptographic protocol (e.g., Secure Sockets Layer (SSL)) to establish a secure connection with client device 100 to exchange a symmetric encryption key. As further described below, client device 100 sends an initiation message including the client certificate, computing device 200 validates the client certificate and requests client device 100 to verify that the client device 100 owns the private key of the public key provided within the client certificate. Upon verification that client device 100 owns the private key, computing device 200 may generate symmetric encryption keys and store the symmetric encryption keys in ICD PKI information 236. In some examples, ICD PKI information 236 may represent a table or any other type of data store. Symmetric encryption key information 236 may include an entry specifying a symmetric encryption key that is mapped to a symmetric encryption key identifier. The ICD PKI information 236 may also store information from the client certificate, such as a common name (e.g., user or device) of the client certificate, a certificate authority that issued the client certificate, and one or more policy rules of a user or device identified by the common name.

In some examples, a user may specify an interval (e.g., via an interface to computing device 200) in which client device 100 is to perform the key exchange process to obtain a new symmetric encryption key, which is stored in ICD PKI information 236. Routing component 250 may send the symmetric encryption key and the symmetric encryption key identifier associated with the symmetric encryption key (and in some examples, the specified interval) to client device 100, which in turn may encrypt the metadata using the symmetric encryption key and include the symmetric encryption key identifier in the packet.

In response to receiving a packet including encrypted metadata and a symmetric encryption key identifier, verification module 237 of routing component 250 may use the symmetric encryption key identifier to perform a lookup of ICD PKI information 236 to identify the symmetric encryption key associated with the symmetric encryption key identifier, and use the symmetric encryption key to decrypt the metadata and in response to verifying the metadata, apply the one or more policy rules specified, e.g., within the ICD PKI information 236, service policies 234, services information 232, and/or any other location in which policy rules are stored, that are mapped to the identity context information. In some examples, verification module 237 of routing component 250 may use the symmetric encryption key to encrypt packets (e.g., response packets) sent towards client device 100. In these examples, routing component 250 may determine from the session information included in the response packet that client device 100 is the destination of the response packet for the session. In response, verification module 237 may, based on the session information, determine the symmetric encryption key associated with the session, encrypt the response packet using the symmetric encryption key, and send the encryption response packet towards client device 100.

Figure 3:
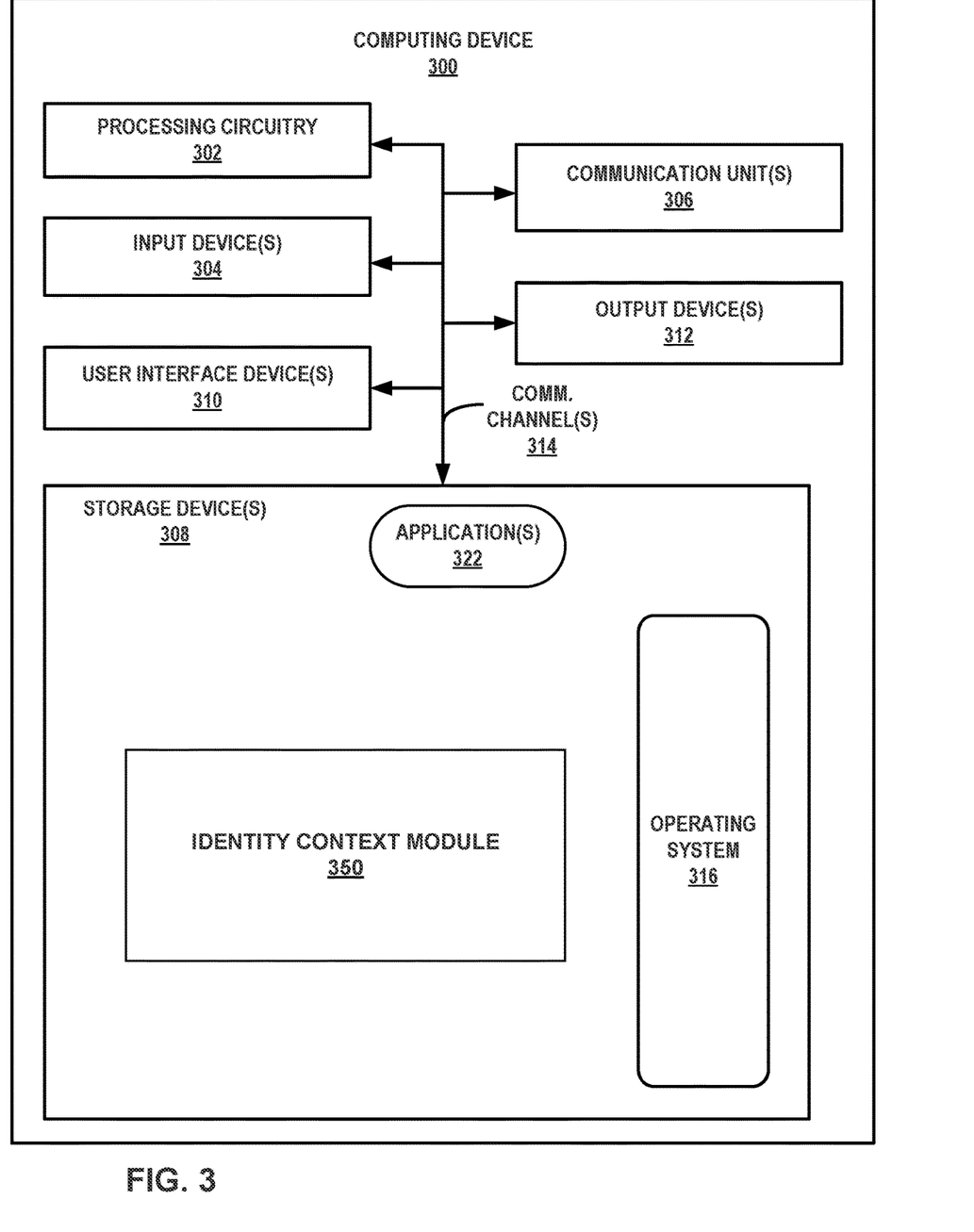
FIG. 3 is a block diagram illustrating an example computing device operating as a client device in accordance with the techniques of the disclosure.

FIG. 3 is a block diagram illustrating an example computing device 300 operating as a client device in accordance with the techniques of the disclosure. In general, computing device 300 may be an example implementation of client device 100 or server 103 of FIG. 1. FIG. 3 illustrates a particular example of a server or other computing device 300. Other examples of computing device 300 may be used in other instances.

As shown in the example of FIG. 3, computing device 300 includes processing circuitry 302, one or more input devices 304, one or more communication units 306, one or more output devices 312, one or more storage devices 308, and one or more user interface (UI) device(s) 310. Computing device 300, in one example, further includes one or more application(s) 322 and operating system 316 that are executable by computing device 300. Each of components 302, 304, 306, 312, 308, and 310 operate similarly to components 202, 204, 206, 212, 208, and 210, respectively, as described above, and are coupled physically, communicatively, and/or operatively) by one or more of communication channels 314 that include a system bus, a network connection, an inter-process communication data structure, or any other method for communicating data.

In this example, computing device 300 includes an identity context module 350 to provide public key infrastructure based session authentication. Identity context module 350 may represent, for example, a driver running in a kernel (not shown) of computing device 300. In some examples, identity context module 350 may interact with a programming interface (not shown), such as a Public-Key Cryptography Standards number 11 (PKCS11) programming interface to obtain a PKI information from a certificate, such as a smart card. In some examples, identity context module 350 may initiate a key exchange process with a router to obtain a symmetric encryption key used to encrypt the metadata, as further described below.

In this example, identity context module 350 may cause computing device 300 to send a packet of a session (e.g., either a first packet (e.g., SYN packet) or response packet (e.g., SYN-ACK packet)) including metadata specifying identity context information and PKI information to a router (e.g., router 110A of FIG. 1). The PKI information may include a public key obtained from a certificate (e.g., user certificate or device certificate) and the identity context information signed with a private key. For example, identity context module 350 may compute a hash value of the identity context information and sign (e.g., encrypt) the hash value with the private key. Computing device 300 then sends the packet including the metadata specifying the identity context information, the public key, and the identity context information signed with the private key to a router configured to perform session-based routing (e.g., router 110A of FIG. 1 or computing device 200 of FIG. 2). In this way, the router that receives the packet may cryptographically verify the identity context information within the metadata and apply one or more policy rules to the packet.

In some examples, computing device 300 may perform a key exchange process with a router (e.g., router 110A of FIG. 1 and computing device 200 of FIG. 2). In some examples, identity context module 350 may use Transport Layer Security (TLS) or other cryptographic protocol (e.g., Secure Sockets Layer (SSL)) to establish a secure connection with router 110A to exchange a symmetric encryption key. As further described below, identity context module 350 of computing device 300 sends an initiation message including the client certificate and in response, receives a response from router 110A including a certificate of router 110A and a request to verify that computing device 300 owns the private key of the public key provided within the client certificate. Upon verification that computing device 300 owns the private key, router 110A may generate a symmetric encryption key and provide the symmetric encryption key to computing device 300. In some examples, computing device 300 may receive a symmetric encryption key identifier associated with the symmetric encryption key. In some examples, computing device 300 may receive a specified interval in which computing device 300 is to perform the key exchange process to obtain a new symmetric encryption key from router 110A.

Identity context module 350 may then send a packet of a session including the session encryption key identifier and metadata specifying the identity context information and PKI information that is encrypted with the session encryption key such that router 110A may decrypt the metadata using the symmetric encryption key associated with the symmetric encryption key identifier included in the packet. In some examples, computing device 300 may send the packet without the PKI information. In these examples, router 110A that receives the packet may use the symmetric encryption key identifier to obtain the PKI information from the ICD PKI table (e.g., ICD PKI information 236 of FIG. 2).

Figure 4:
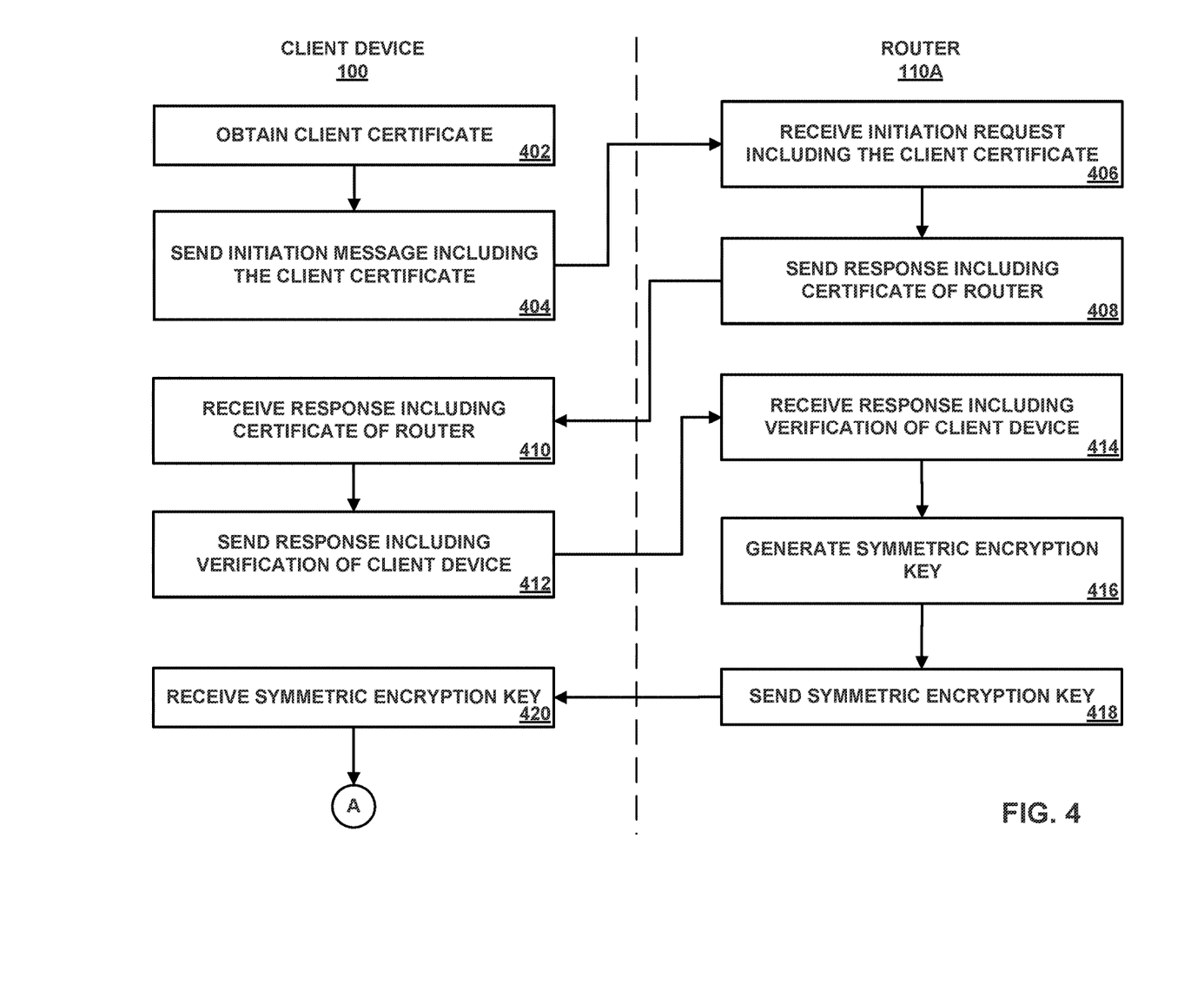
FIG. 4 is a block diagram illustrating an example symmetric encryption key exchange process in accordance with the techniques of the disclosure.

FIG. 4 is a flowchart illustrating an example of a symmetric encryption key exchange process in accordance with the techniques of the disclosure. FIG. 4 is described with respect to client device 100 and router 110A of FIG. 1, computing device 200 of FIG. 2, and computing device 300 of FIG. 3.

In this example, client device 100 may obtain a client certificate (402). For example, identity context module 350 of client device 100 may use a programming interface (e.g., PKCS11) to obtain a client certificate from a smart card. In response to obtaining the client certificate, identity context module 350 of client device 100 initiates a connection (e.g., TLS connection) with router 110A to obtain a symmetric encryption key. For example, identity context module 350 may cause client device 100 to send an initiation message ("Hello" message) with the client certificate to router 110A (404).

In response to receiving the initiation request including the client certificate (406), router 110A validates the client certificate and sends a response including a certificate of the router with a request for client device 100 to verify that client device 100 has access to the private key for the public key that was provided to router 110A (408).

After receiving the response from router 110A (410), identity context module 350 may validate if router 110A is authentic using the certificate of the router, and if validated, perform a private key operation and send a response back to router 110A including proof that client device 100 has access to the private key for the public key of the client certificate (412).

Router 110A receives the response including verification of client device 100 (414) and, in response, generates a symmetric encryption key (416). The symmetric encryption key is separate from the encryption key used to encrypt TLS messages. In some examples, router 110A may generate a symmetric encryption key and store the symmetric encryption key in ICD PKI information 236. The symmetric encryption key may be mapped to a symmetric encryption key identifier. Router 110A may use a symmetric encryption key identifier included in an incoming packet to perform a lookup of ICD PKI information 236 to identify the symmetric encryption key associated with the symmetric encryption key identifier, and in some examples, one or more policy rules associated with the identity context information specified within the client certificate.

Router 110A then sends the symmetric encryption key (and symmetric encryption key identifier) to client device 100 (418). In some examples, router 110A also sends a specified interval in which client device 100 is to perform the symmetric encryption key exchange process to obtain a new symmetric encryption key from router 110A. Client device 100 receives the symmetric encryption key (420) and may encrypt metadata using the symmetric encryption key, as further described in FIG. 5. The example illustrated in FIG. 4 is merely one example symmetric encryption key exchange process described with respect to TLS 1.2, but the techniques may use other symmetric encryption key exchange processes, such as TLS 1.3. Additional examples of TLS 1.2 are described in T. Dierks, et al., "The Transport Layer Security (TLS) Protocol Version 1.2," Request for Comments (RFC) 5246, August 2008, and additional examples of TLS 1.3 are described in E. Rescorla, "The Transport Layer Security (TLS) Protocol Version 1.3, RFC 8446, August 2018, the entire contents of each of which is incorporated herein by reference.

Figure 5:
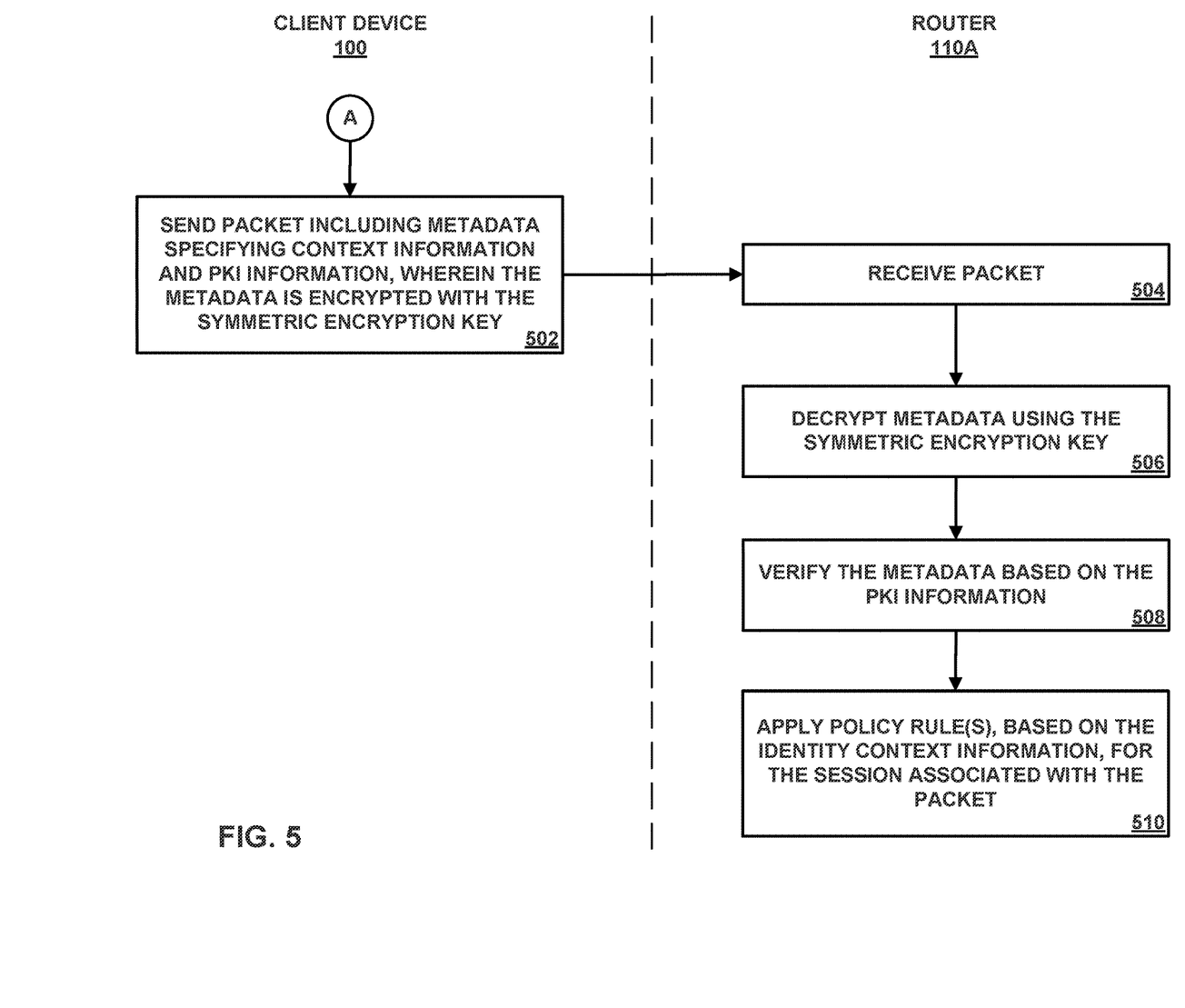
FIG. 5 is a flowchart illustrating an example operation of public key infrastructure based session authentication in accordance with the techniques of the disclosure.

FIG. 5 is a flowchart illustrating an example operation of public key infrastructure based session authentication in accordance with the techniques of the disclosure. FIG. 5 is described with respect to client device 100 and router 110A of FIG. 1, computing device 200 of FIG. 2, and computing device 300 of FIG. 3.

In response to receiving the symmetric encryption key from router 110A, client device 100 sends a packet (e.g., packet 42 of FIG. 1) including metadata specifying context information and PKI information, wherein the metadata (or payload including the metadata) is encrypted with the symmetric encryption key (502). For example, identity context module 350 of client device 100 may send a packet including metadata that specifies identity context information specifying the user or machine-specific information and PKI information including a public key from the client certificate, and sign the metadata with a private key. In some examples in which the public key is not specified in the metadata, router 110A may use the symmetric encryption key identifier to obtain the public key used to verify the identity context information that has been signed with the private key. For example, client device 100 may send a packet including a symmetric encryption key identifier and metadata specifying the identity context information and PKI information without the public key, and router 110A may use the symmetric encryption key identifier to perform a lookup of the table storing the PKI information to obtain the public key to verify the signed identity context information specified in the metadata. In some examples, the symmetric encryption key is used to provide validation of the identity context information. In these examples, the metadata need not specify the signature of the identity context information, which eliminates the need to sign each session, which may be process intensive and time consuming. Identity context module 350 of client device 100 may further encrypt the metadata (or the payload including the metadata) using the symmetric encryption key received from router 110A and include a symmetric encryption key identifier associated with the symmetric encryption key used to encrypt the metadata. In some examples, client device 100 may further encrypt the packet with the encryption for the VPN, which adds and extra layer of encryption using different encryption algorithms and keys.

In response to receiving the packet including metadata specifying the identity context information and PKI information (504), router 110A may decrypt the metadata (or payload including the metadata if the payload is encrypted) of the packet using the symmetric encryption key (506). For example, router 110A may, using the symmetric encryption key identifier included in the packet, perform a lookup of ICD PKI information 236 to identify the symmetric encryption key associated with the symmetric encryption key identifier. Router 110A may use the symmetric encryption key to decrypt the metadata of the packet to recover the identity context information and PKI information. Router 110A verifies the metadata of the packet (508) and if verified, router 110A applies, based on the identity context information, one or more policy rules for the session associated with the packet (510). For example, router 110A may use the public key (e.g., from the metadata or obtained using a symmetric encryption key identifier included in the packet) to verify the signature that was signed by client device 100 with the private key. For example, router 110A computes a hash of the metadata of the received packet and if the computed hash is the same as the hash obtained from the decrypted signature (e.g., decrypted using the public key), router 110A determines that client device 100 (or a user of the client device 100) did in fact sign the metadata and has access to the private key used to sign the metadata.

Although the operation described in FIG. 5 includes encrypting the metadata (or payload including the metadata) with the symmetric encryption key, client device 100 may send a packet including unencrypted metadata specifying identity context information and PKI information including the public key.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network device comprising:
one or more processors; and
memory in communication with the one or more processors, the memory storing instructions that, upon execution, cause the one or more processors to:
generate a symmetric encryption key based on validation of a digital certificate of a source client device and validation of a digital certificate of the network device, wherein the digital certificate of the source client device and the digital certificate of the network device are exchanged between the network device and the source client device;
send, to the source client device, the symmetric encryption key;
receive, from the source client device, a packet including: a header for routing the packet to a destination client device specified by the header, and metadata that is distinct from the header and encrypted using the symmetric encryption key by the source client device, the metadata specifying public key infrastructure (PKI) information and identity context information identifying a user or device participating in a session between the source client device and the destination client device;
decrypt, using the symmetric encryption key, the encrypted metadata of the packet received from the source client device;
verify, based on the PKI information specified by the metadata, the identity context information specified by the metadata; and
apply, based on verifying the identity context information specified by the metadata, one or more policy rules associated with the identity context information for the session associated with the packet.

2. The network device of claim 1,
wherein the PKI information comprises a public key, and
wherein to verify the identity context information specified by the metadata, the instructions further cause the one or more processors to verify a signature of the metadata using the public key, wherein the signature of the metadata is signed by the source client device with a private key that corresponds to the public key.

3. The network device of claim 1, wherein the instructions further cause the one or more processors to:
generate a symmetric encryption key identifier associated with the symmetric encryption key;
send the symmetric encryption key identifier to the source client device; and
based on receiving the packet, determine, based on the symmetric encryption key identifier included in the packet, the symmetric encryption key to be used to decrypt the encrypted metadata.

4. The network device of claim 3, wherein the instructions further cause the one or more processors to:
generate a data structure storing an entry mapping the symmetric encryption key identifier to the symmetric encryption key, wherein the data structure includes a common name of a user or device identified in a digital certificate, a certificate authority that issued the digital certificate, and one or more policy rules of the user or device identified in the digital certificate.

5. The network device of claim 1, wherein the instructions further cause the one or more processors to:
send, to the source client device, data indicative of a time interval after which to generate a new symmetric encryption key.

6. The network device of claim 1, wherein the PKI information is obtained by the source client device from a digital certificate of a user or the digital certificate of the source client device.

7. The network device of claim 1, wherein the identity context information includes information indicative of one or more of a source application, a user, a security identifier, domain, or system information including static system information or variable system information.

8. The network device of claim 1, wherein to decrypt the encrypted metadata of the packet, the instructions further cause the one or more processors to decrypt an encrypted payload of the packet including the metadata using the symmetric encryption key.

9. A method comprising:
generate, by a network device, a symmetric encryption key based on validation of a digital certificate of a source client device and validation of a digital certificate of the network device, wherein the digital certificate of the source client device and the digital certificate of the network device are exchanged between the network device and the source client device;
send, by the network device and to the source client device, the symmetric encryption key;
receiving, by the network device and from the source client device, a packet including a header for routing the packet to a destination client device specified by the header, and metadata that is distinct from the header and encrypted using the symmetric encryption key by the source client device, the metadata specifying public key infrastructure (PKI) information and identity context information identifying a user or device participating in a session between the source client device and the destination client device;
decrypt, by the network device and using the symmetric encryption key, the encrypted metadata of the packet;
verifying, by the network device and based on the PKI information specified by the metadata, the identity context information specified by the metadata; and
applying, by the network device, based on verifying the identity context information specified by the metadata, one or more policy rules associated with the identity context information for the session associated with the packet.

10. The method of claim 9,
wherein the PKI information comprises a public key, and
wherein verifying the identity context information specified by the metadata comprises verifying a signature of the metadata using the public key, wherein the signature of the metadata is signed by the source client device with a private key that corresponds to the public key.

11. The method of claim 9, further comprising:
establishing, by the network device, a connection with the source client device to exchange the symmetric encryption key.

12. The method of claim 11, wherein establishing the connection with the source client device comprises:
receiving, by the network device and from the source client device, an initiation message including the digital certificate of the source client device including a public key;
validating, by the network device, the digital certificate of the source client device;
sending, by the network device and to the source client device, a response message with the digital certificate of the network device and a request to verify ownership of a private key for the public key included in the digital certificate of the source client device; and
receiving, by the network device and from the source client device, a response message with verification of ownership of the private key for the public key included in the digital certificate of the source client device.

13. The method of claim 9, further comprising:
generating, by the network device, a symmetric encryption key identifier associated with the symmetric encryption key;
sending, by the network device, the symmetric encryption key identifier to the source client device; and
in response to receiving the packet, determining, by the network device and based on the symmetric encryption key identifier included in the packet, the symmetric encryption key to be used to decrypt the encrypted metadata.

14. The method of claim 9, further comprising:
sending, by the network device and to the source client device, data indicative of a time interval after which to generate a new symmetric encryption key.

15. The method of claim 9, wherein the metadata included in the packet comprises a first portion of metadata, the method further comprising:

modifying, by the network device, the packet to include a second portion of metadata specifying a session identifier for the session between the source client device and the destination client device.

16. A client device comprising:
one or more processors; and
memory in communication with the one or more processors, the memory storing instructions that, upon execution, cause the one or more processors to:
receive, from a network device, a symmetric encryption key generated by the network device based on validation of a digital certificate of the client device and validation of a digital certificate of the network device, wherein the digital certificate of the client device and the digital certificate of the network device are exchanged between the network device and the client device;
obtain identity context information identifying a user or device participating in a session between the client device and a destination client device;
obtain public key infrastructure (PKI) information from the digital certificate of the client device; and
send, to the network device, a packet for the session including a header for routing the packet to the destination client device specified within the header, and metadata that is distinct from the header and encrypted using the symmetric encryption key by the client device, the metadata specifying the identity context information and the PKI information.

17. The client device of claim 16, wherein the instructions further cause the one or more processors to:
establish a connection with the network device to exchange the symmetric encryption key from the network device.

18. The client device of claim 16, wherein the identity context information comprises one or more of a source application, a user, a security identifier, domain, or system information including static system information or variable system information, and
wherein the PKI information comprises:
a public key from the digital certificate of the client device; and
identity context information signed with a private key.

19. The network device of claim 1, wherein the instructions further cause the one or more processors to:
establish a connection with the source client device to send the symmetric encryption key.

20. The method of claim 9, wherein decrypting the encrypted metadata of the packet comprises decrypting a payload of the packet including the encrypted metadata using the symmetric encryption key.

* * * * *